United States Patent
Takamatsu

(10) Patent No.: US 8,111,469 B2
(45) Date of Patent: Feb. 7, 2012

(54) COMBINED GEAR, LENS ADJUSTMENT MECHANISM, AND ELECTRONIC DEVICE

(75) Inventor: Hiroaki Takamatsu, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 224 days.

(21) Appl. No.: 12/227,785

(22) PCT Filed: Mar. 28, 2008

(86) PCT No.: PCT/JP2008/056124
§ 371 (c)(1),
(2), (4) Date: Nov. 26, 2008

(87) PCT Pub. No.: WO2009/118898
PCT Pub. Date: Oct. 1, 2009

(65) Prior Publication Data
US 2010/0232035 A1    Sep. 16, 2010

(51) Int. Cl.
*G02B 15/14* (2006.01)
(52) U.S. Cl. .................................................. 359/696
(58) Field of Classification Search ........... 359/694–706
See application file for complete search history.

(56) References Cited

U.S. PATENT DOCUMENTS

| | | | | |
|---|---|---|---|---|
| 5,505,400 | A * | 4/1996 | Boelstler et al. | 242/382.2 |
| 6,997,079 | B2 * | 2/2006 | Nomura et al. | 74/440 |
| 2001/0028512 | A1 * | 10/2001 | Noguchi | 359/694 |
| 2003/0015051 | A1 | 1/2003 | Nomura et al. | |
| 2003/0201600 | A1 | 10/2003 | Hayashi | |

OTHER PUBLICATIONS

European Search Report dated Apr. 1, 2011.

* cited by examiner

*Primary Examiner* — Ricky Mack
*Assistant Examiner* — Vipin Patel
(74) *Attorney, Agent, or Firm* — McGinn IP Law Group, PLLC

(57) ABSTRACT

A combined gear includes a pair of first gear and second gear having the same tooth profile and rotatably combined in a state, wherein rotation centers of the gears are coincident. One gear of the pair of gears includes an elastic displacement portion that is biased in a direction of rotating the other gear with respect to one gear. The other gear includes a positioning portion that positions the other gear with respect to one gear, and elastic displacement portion contacts positioning portion.

13 Claims, 9 Drawing Sheets

COMBINED GEAR, LENS ADJUSTMENT MECHANISM, AND ELECTRONIC DEVICE

TECHNICAL FIELD

The present invention relates to a combined gear including a pair of gears engaged with centers of rotation aligned, a lens adjustment mechanism, and an electronic apparatus.

BACKGROUND ART

For example, a projection type display apparatus that projects images on a projection surface such as a screen has been known. Such a projection type display apparatus includes an autofocus mechanism for adjusting the focal length of a projection lens that projects the images.

FIG. 1 is a perspective view of an autofocus mechanism included in a projection type display apparatus related to the present invention. As shown in FIG. 1, autofocus mechanism 101 includes projection lens 103, a lens support mechanism (not shown) that supports projection lens 103 movably in an optical axis direction, and focus ring 104 that moves projection lens 103 by using the lens support mechanism.

Autofocus mechanism 101 also includes detection gear 106 that rotates with rotation of focus ring portion gear 105 formed in focus ring 104, rotation detection element 107 that detects the amount of rotation of detection gear 106, drive motor 108 that drives focus ring portion gear 105, and a control circuit (not shown) that controls driving drive motor 108 on the basis of the detection result of rotation detection element 107.

Rotation detection element 107 is placed near an outer peripheral portion of focus ring 104, and a rotating shaft portion (not shown) of detection gear 106 is mounted in a shaft hole (not shown) in rotation detection element 107. Detection gear 106 meshes with focus ring portion gear 105. Rotation detection element 107 detects the rotation of focus ring 104 that rotates with the movement of projection lens 103 by using detection gear 106.

Drive motor 108 has a rotating shaft (not shown) to which drive gear 110 is mounted. Drive gear 110 meshes with focus ring portion gear 105, and drive motor 108 is rotationally driven to rotate focus ring 104.

FIG. 2 shows a flowchart that represents a process for controlling the autofocus mechanism. As shown in FIG. 2, the projection type display apparatus includes distance sensor 125 that detects a focal length, and on the basis of distance information measured by distance sensor 125, central processing unit (CPU) 126 of the control circuit controls driving drive motor 108 so that the output of rotation detection element 107 reaches a predetermined value to rotate focus ring 104, thereby adjusting focus.

DISCLOSURE OF THE INVENTION

In the above described autofocus mechanism, gear meshing state between the detection gear provided in the rotation detection element and the focus ring portion gear requires a predetermined backlash in terms of structure. However, an influence of the backlash on autofocus performance is not negligible.

In a manufacturing process, the control circuit is adjusted so that distance information from the distance sensor and the output of the rotation detection element have a predetermined relationship. In this adjustment, the relationship between the output of the rotation detection element and the distance information is adjusted. Thus, this adjustment is indirectly performed for a relationship between the rotation detection element and the focus ring portion gear of the projection lens. Thus, backlash between the focus ring portion gear and the detection gear provided in the rotation detection element has a direct influence on displacement between the focus ring and the rotation detection element.

The above described focus ring portion gear and detection gear are in reliable contact with each other when rotation is continued rotating in the same direction. However, when the gears are reversely rotated after the rotation thereof is once stopped, the amount of rotation of the rotation detection element does not reach the amount of rotation of the focus ring portion gear by the amount of backlash between the focus ring portion gear and the detection gear to cause displacement, which may cause displacement of focus adjustment.

This has been fixed in projection lens by increasing a depth of focus of the projection lens or the like, but a recent reduction in size of projection type display apparatuses makes the fixing in the projection lens difficult. Strict adjustment of gear meshing state between gears or strict dimension control of gear teeth enables a backlashless gear structure in theory. However, such a measure has a large influence on manufacturing costs, and thus autofocus performance is sacrificed under present circumstances.

As art related to the present invention for eliminating backlash, a configuration of a so-called backlashless gear in which backlash does not exist is proposed in which two gears are combined with a torsion coil spring held therebetween. However, the structure in which the coil spring is placed between the two gears increases the size of the gear, and is difficult to be applied as a gear having a relatively small diameter such as, for example, a rotation detection element.

The present invention has an object to provide a combined gear applicable to a rotation detection element or the like as a relatively small gear having a low load and a small diameter, a lens adjustment mechanism, and an electronic apparatus.

To achieve the above described object, a combined gear according to the present invention includes a pair of gears having the same tooth profile and rotatably combined in a state wherein rotation centers of the gears are coincident. One gear of the pair of gears is formed with an elastic displacement portion that is biased in a direction of rotating the other gear with respect to one gear. The other gear is formed so that it has a positioning portion that positions the other gear with respect to one gear, and the elastic displacement portion contacts the positioning portion.

In the present invention, the pair of gears having the same tooth profile refers to the pair of gears having the same number of teeth, the same reference pitch circle diameter, and the same module, or the like.

A lens adjustment mechanism according to the present invention includes: a combined gear described above according to the present invention; and a rotation detection element that detects the amount of rotation of the combined gear which is rotated following a movement of a lens in an optical axis direction.

An electronic apparatus according to the present invention includes a lens adjustment mechanism described above according to the present invention.

According to the present invention, backlash between the combined gear and a gear that meshes with the combined gear can be eliminated. Thus, the lens adjustment mechanism and the electronic apparatus according to the present invention can increase accuracy of lens adjustment.

BEST MODE FOR CARRYING OUT THE INVENTION

Now, a detailed exemplary embodiment of the present invention will be described with reference to the drawings.

As an electronic apparatus according to the present invention, a projection type display apparatus including an autofocus mechanism as an example of a lens adjustment mechanism that adopts a combined gear will be described. The electronic apparatus, including the lens adjustment mechanism, is not limited to the projection type display apparatus including the autofocus mechanism, but may be various types of camera devices such as a video camera device.

Figure 3:
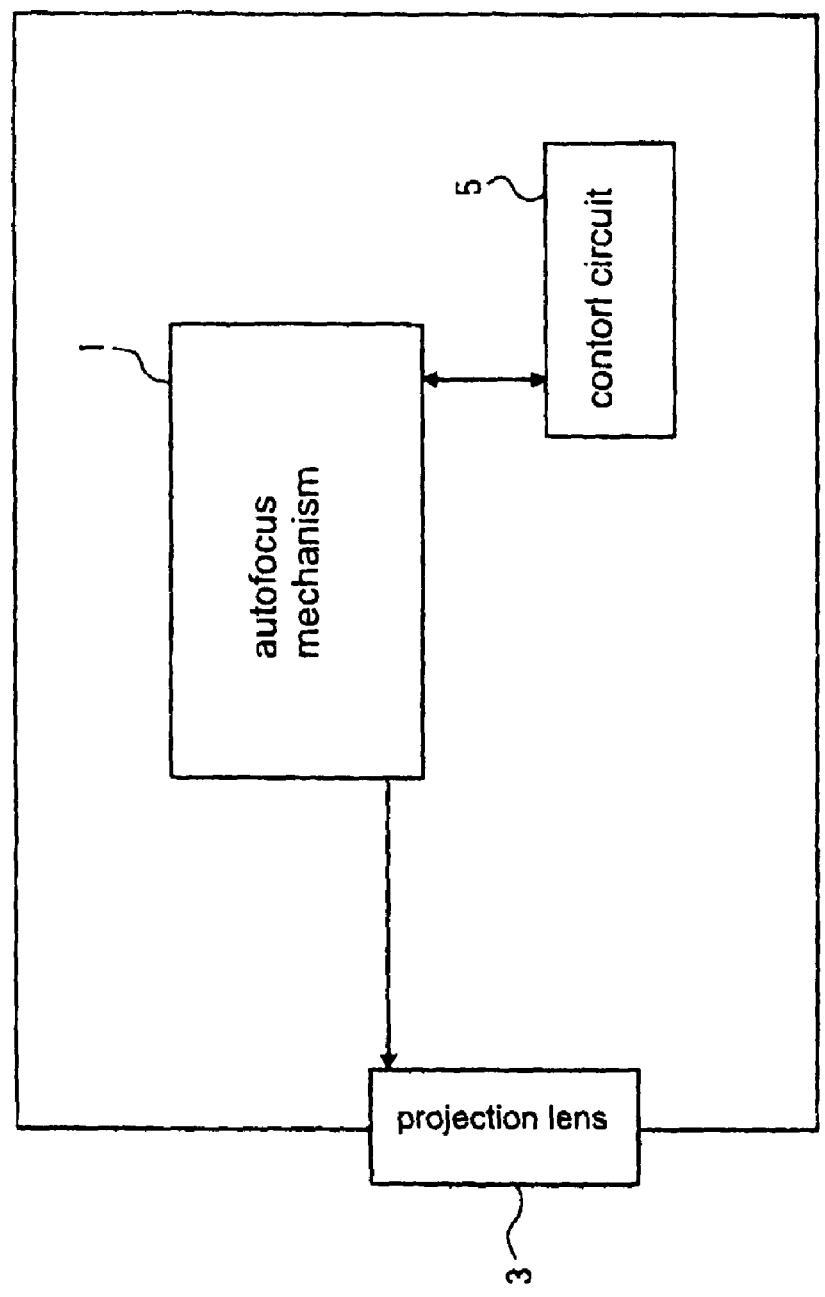
FIG. 3 is a schematic diagram of a projection type display apparatus according to an exemplary embodiment.

As shown in FIG. 3, the projection type display apparatus of the exemplary embodiment includes a projection optical system (not shown) including projection lens 3 for projecting images on a projection surface, autofocus mechanism 1 that adjusts a focus position of projection lens 3, and control circuit 5 that controls autofocus mechanism 1. The projection type display apparatus includes, though not shown, an illumination optical system including a light source, and an image display element to which an illumination light is applied by the illumination optical system.

Figure 4:
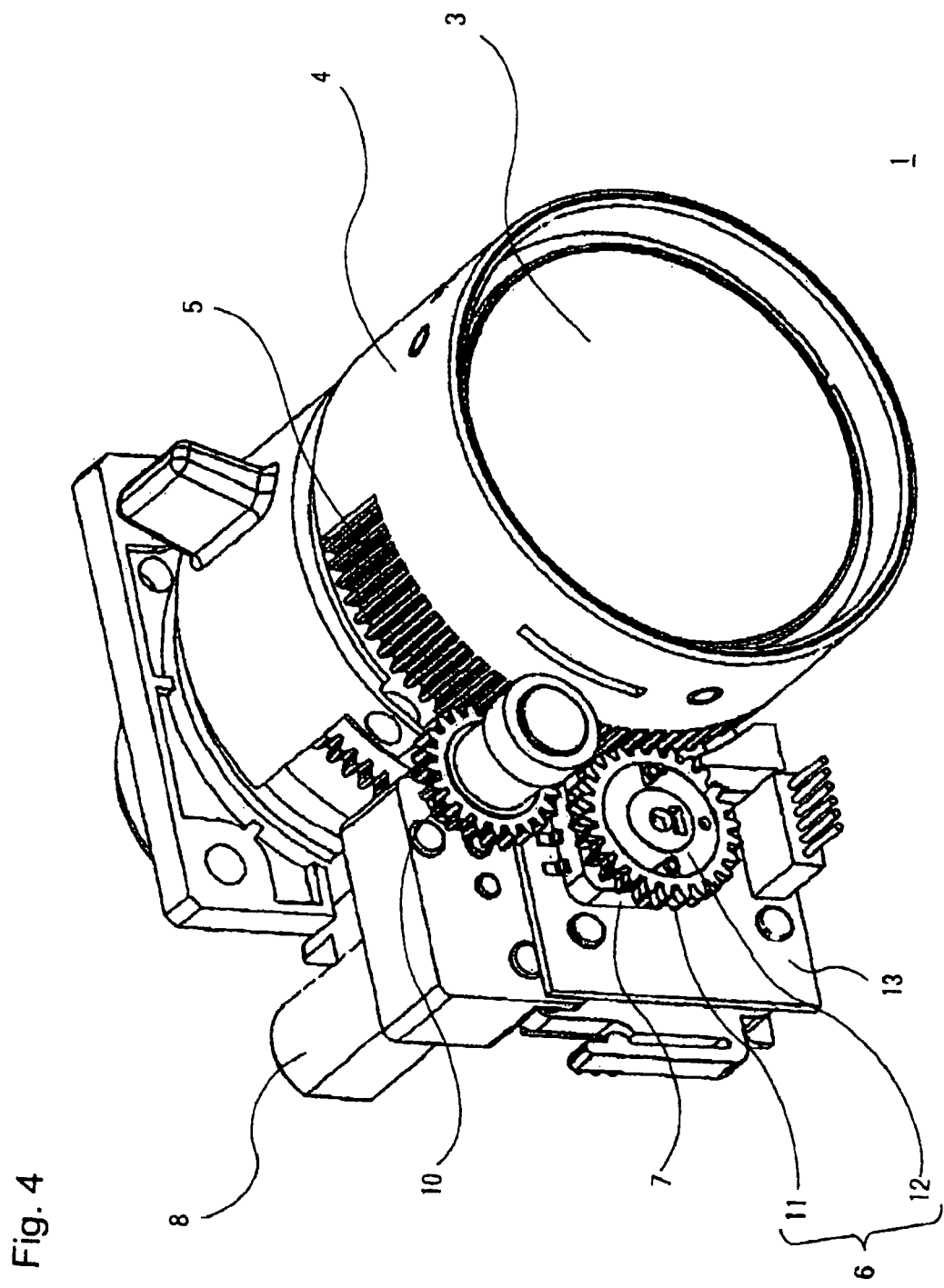
FIG. 4 is a perspective view of an autofocus mechanism including a backlashless gear according to the exemplary embodiment.

FIG. 4 is a perspective view of the autofocus mechanism included in the projection type display apparatus. As shown in FIG. 4, autofocus mechanism 1 of the exemplary embodiment includes lens support mechanism (not shown) that supports projection lens 3 movably in an optical axis direction, and focus ring 4 that moves projection lens 3 in the optical axis direction by using the lens support mechanism.

Figure 5:
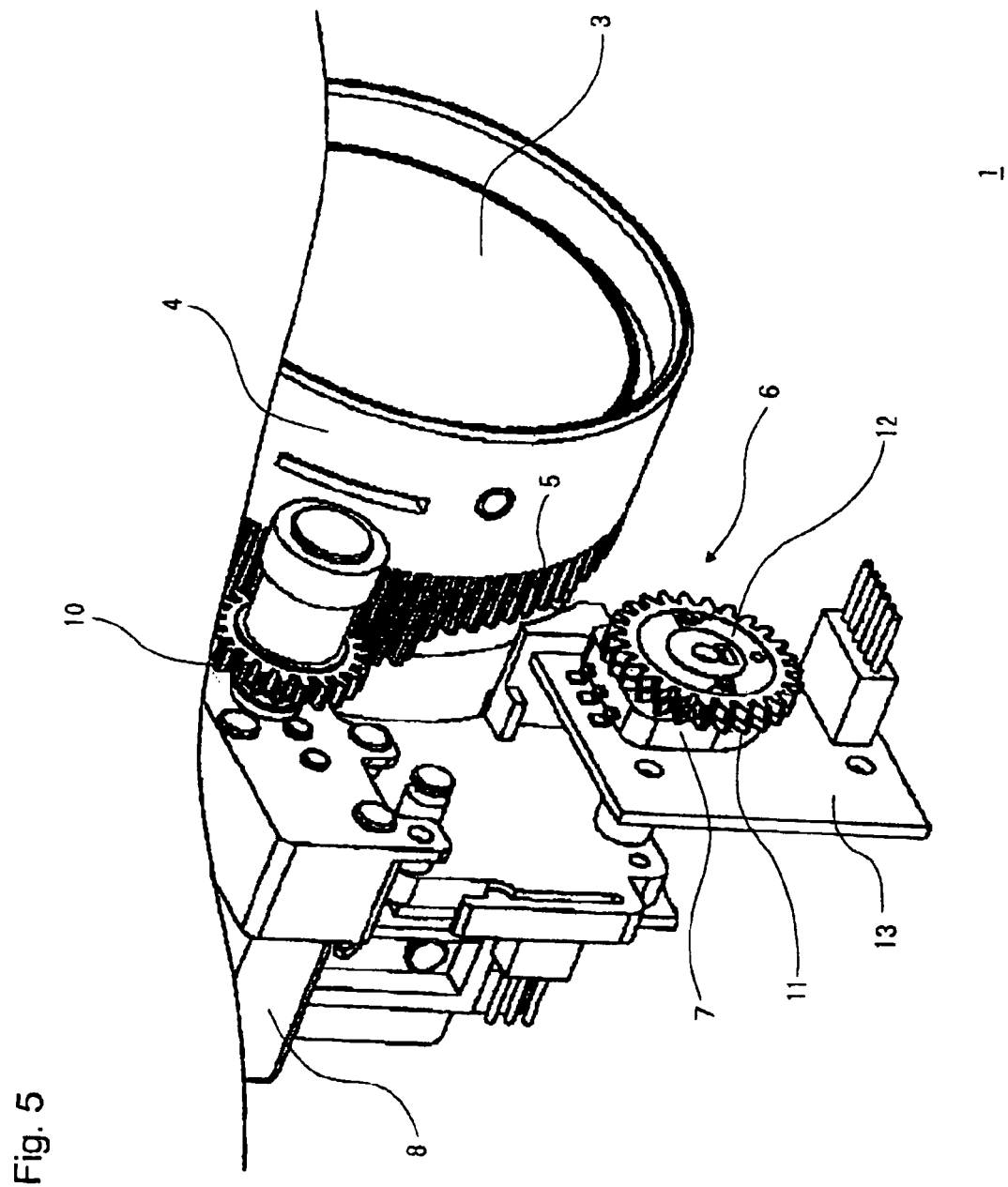
FIG. 5 is a perspective view, partially exploded, of the autofocus mechanism.

As shown in FIGS. 4 and 5, autofocus mechanism 1 also includes backlashless gear 6 as a combined gear that rotates with rotation of focus ring 4, rotation detection element 7 that detects the amount of rotation of backlashless gear 6, drive motor 8 that drives focus ring 4, and control circuit 5 that controls driving drive motor 8 on the basis of the detection result of rotation detection element 7.

In an outer peripheral portion of focus ring 4, focus ring portion gear 5 is circumferentially formed. Drive motor 8 has a rotating shaft (not shown) to which drive gear 10 is mounted. Drive gear 10 meshes with focus ring portion gear 5, and drive motor 8 is rotationally driven to rotate focus ring 4. Rotation detection element 7 is provided on circuit board 13, and backlashless gear 6 is mounted to rotation detection element 7.

Figure 6:
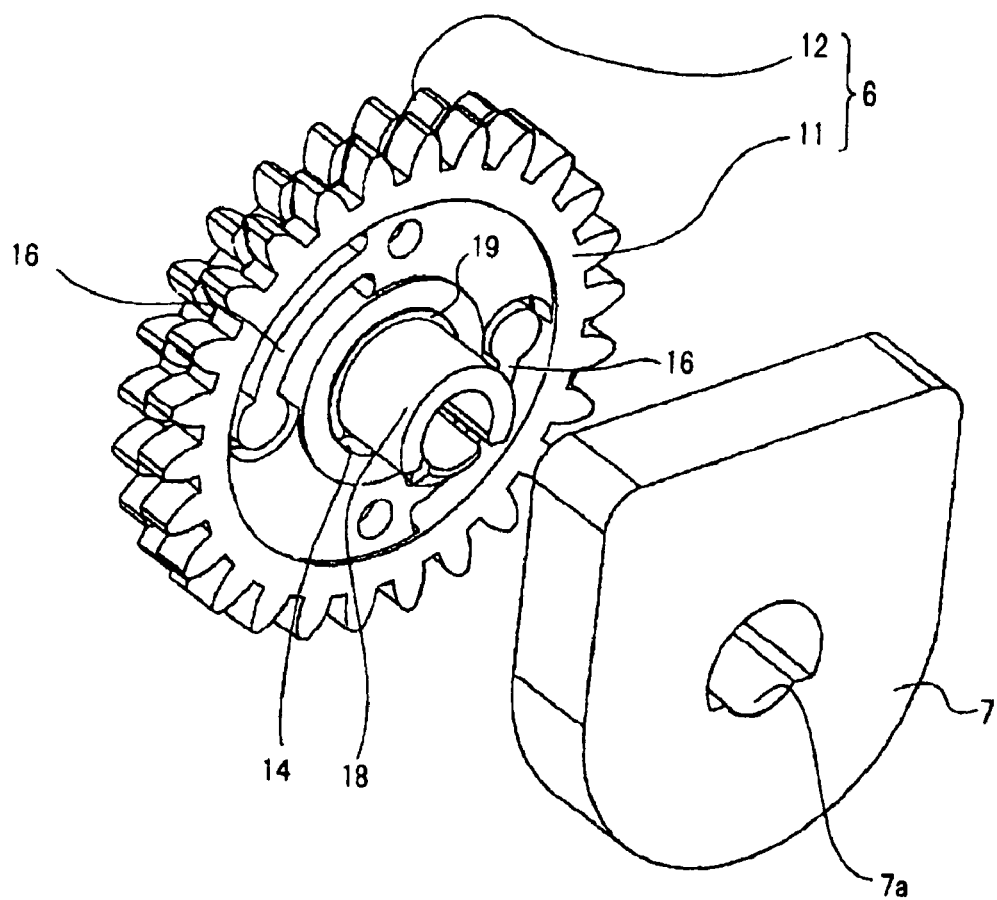
FIG. 6 is a perspective view of the backlashless gear.
Figure 7:
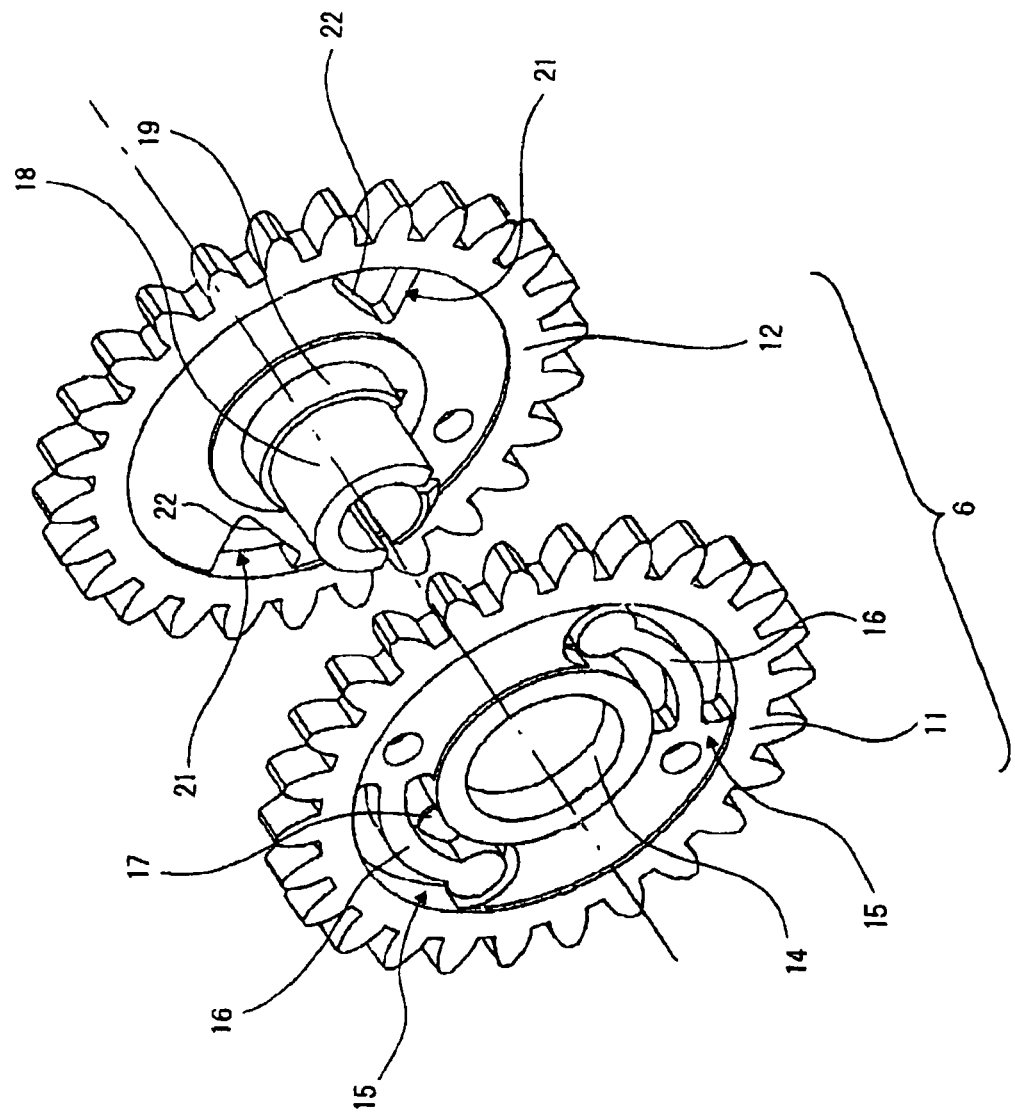
FIG. 7 is an exploded view of the backlashless gear.

With reference to FIGS. 6 and 7, an example of backlashless gear 6 of the exemplary embodiment will be described.

As shown in FIGS. 6 and 7, backlashless gear 6 includes a combination of first gear 11 that functions as a standard gear, and second gear 12 that functions as an auxiliary gear. First and second gears 11 and 12 have the same tooth profile and are rotatably combined in a state wherein rotation centers of the gears are coincident. The gears having the same tooth profile refers to the gears having the same number of teeth, the same reference pitch circle diameter, and the same module, or the like. First gear 11 and second gear 12 have, for example, an outer diameter of about 14 mm and a pitch circle diameter of about 13 mm.

First gear 11 is formed with fitting hole 14 in which second gear 12 fits. First gear 11 is also formed with a pair of elastic displacement portions 15 that are biased in a direction of rotating second gear 12 with respect to first gear 11.

Each of elastic displacement portions 15 includes arm 16 arcuately extending circumferentially of first gear 11, and at an end of arm 16, a cylindrical contact pin 17 as a shaft portion is integrally formed. Contact pin 17 extends in parallel with an axial direction of first gear 11, and contacts second gear 12 when first gear 11 and second gear 12 are combined.

On second gear 12, rotating shaft 18 secured in shaft hole 7a in rotation detection element 7 is integrally formed in a protruding manner. On an outer peripheral portion of rotating shaft 18, fitting portion 19 fitted into fitting hole 14 in first gear 11 is integrally formed.

Figure 8:
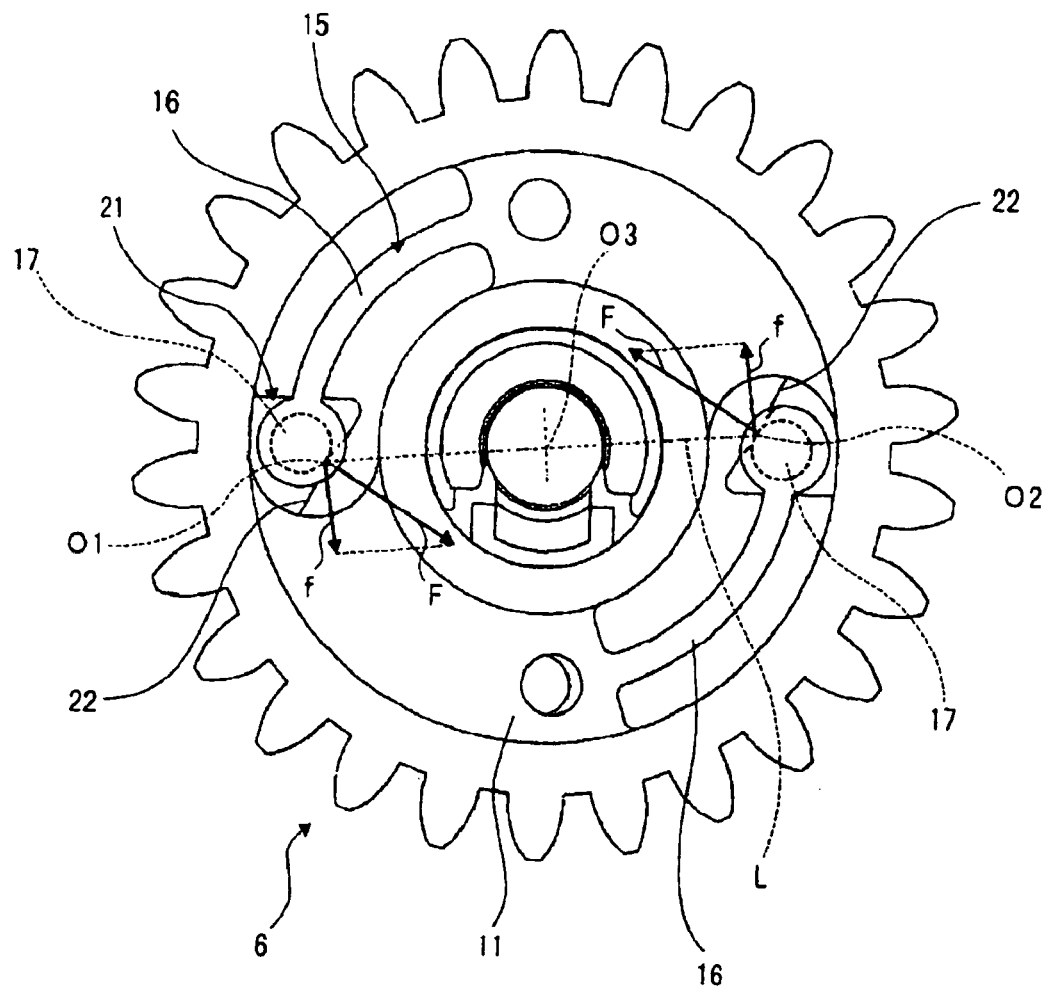
FIG. 8 is a plan view for illustrating the state of applying a biasing force through the elastic displacement portion of the backlashless gear.

Second gear 12 is formed with a pair of positioning portions 21 that position second gear 12 with respect to first gear 11, and elastic displacement portions 15 contact positioning portions 21. Positioning portion 21 is formed as an opening portion in which contact pin 17 on arm 16 of elastic displacement portion 15 is inserted and that has contact surface 22 against which contact pin 17 makes contact, and as shown in FIG. 8, contact surface 22 is formed to incline, with respect to a direction in which the normal line (tangent line) of the reference pitch circle of second gear 12 extends.

Contact points O1 and O2 between contact pins 17 on elastic displacement portions 15 and contact surfaces 22 of positioning portions 21 are provided with center of rotation O3 of gears 11 and 12 therebetween, and contact points O1 and O2 are positioned on line L passing through center of rotation O3. Such a configuration causes arm 16 of elastic displacement portion 15 to be elastically displaced when first gear 11 and second gear 12 are combined, and thus a circumferential biasing force is generated to rotate second gear 12 with respect to first gear 11.

First gear 11 and second gear 12 are combined by fitting portion 19 that rotatably fitted in fitting hole 14. At this time, in each of positioning portions 21 provided in first gear 11, contact pin 17 provided on each elastic displacement portion 15 of second gear 12 is inserted.

As shown in FIG. 6, first gear 11 and second gear 12 are configured so that the teeth are circumferentially displaced from a position where the teeth coincide with each other before meshing with focus ring portion gear 5 of projection lens 3. In the combined state of backlashless gear 6 as described above, rotating shaft portion 18 of second gear 12 is fitted in shaft hole 7a in rotation detection element 7. Thus, rotation detection element 7 rotates with the rotation of second gear 12 of backlashless gear 6.

Figure 1:
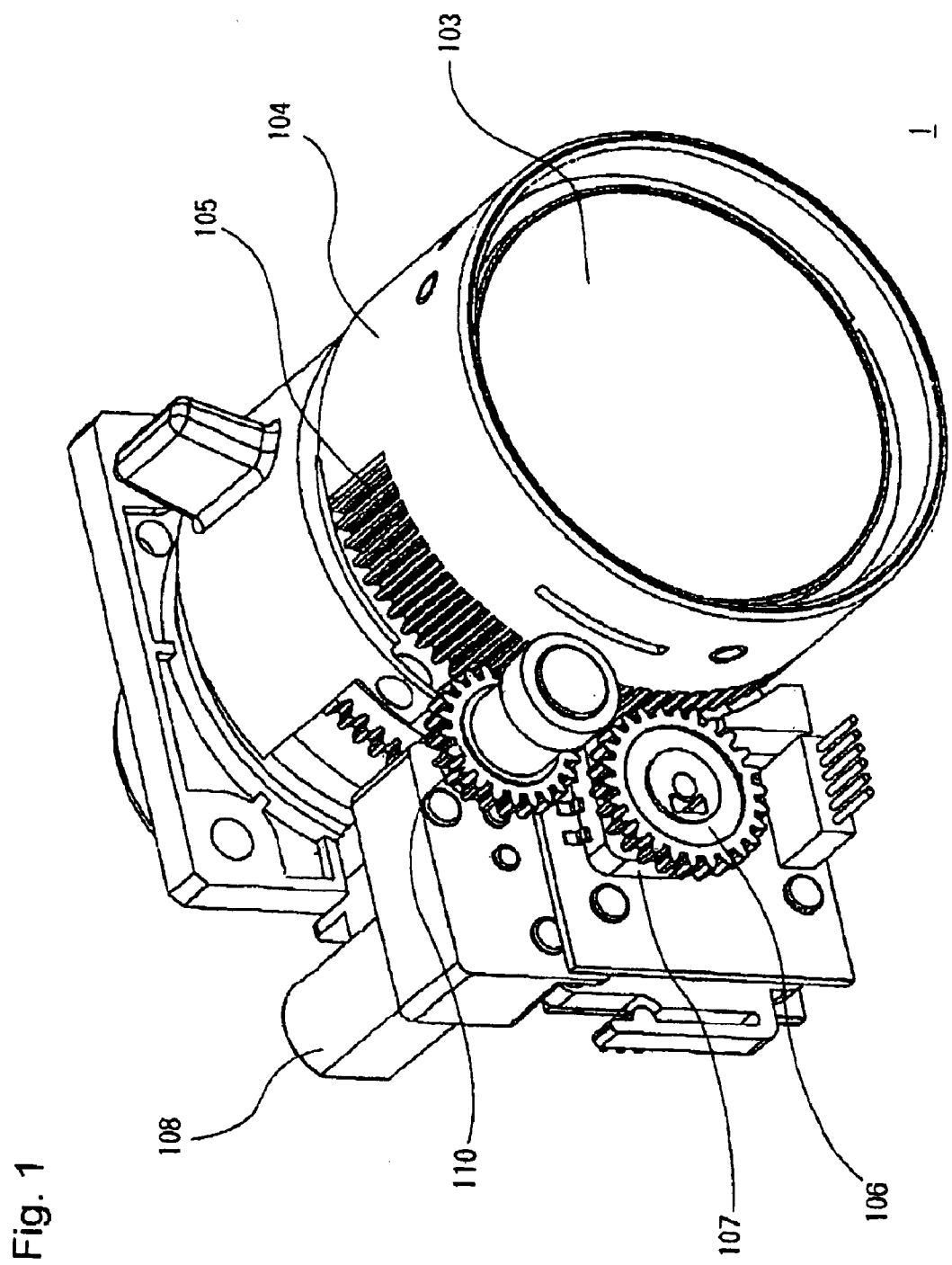
FIG. 1 is a perspective view of an autofocus mechanism using a gear related to the present invention.
Figure 2:
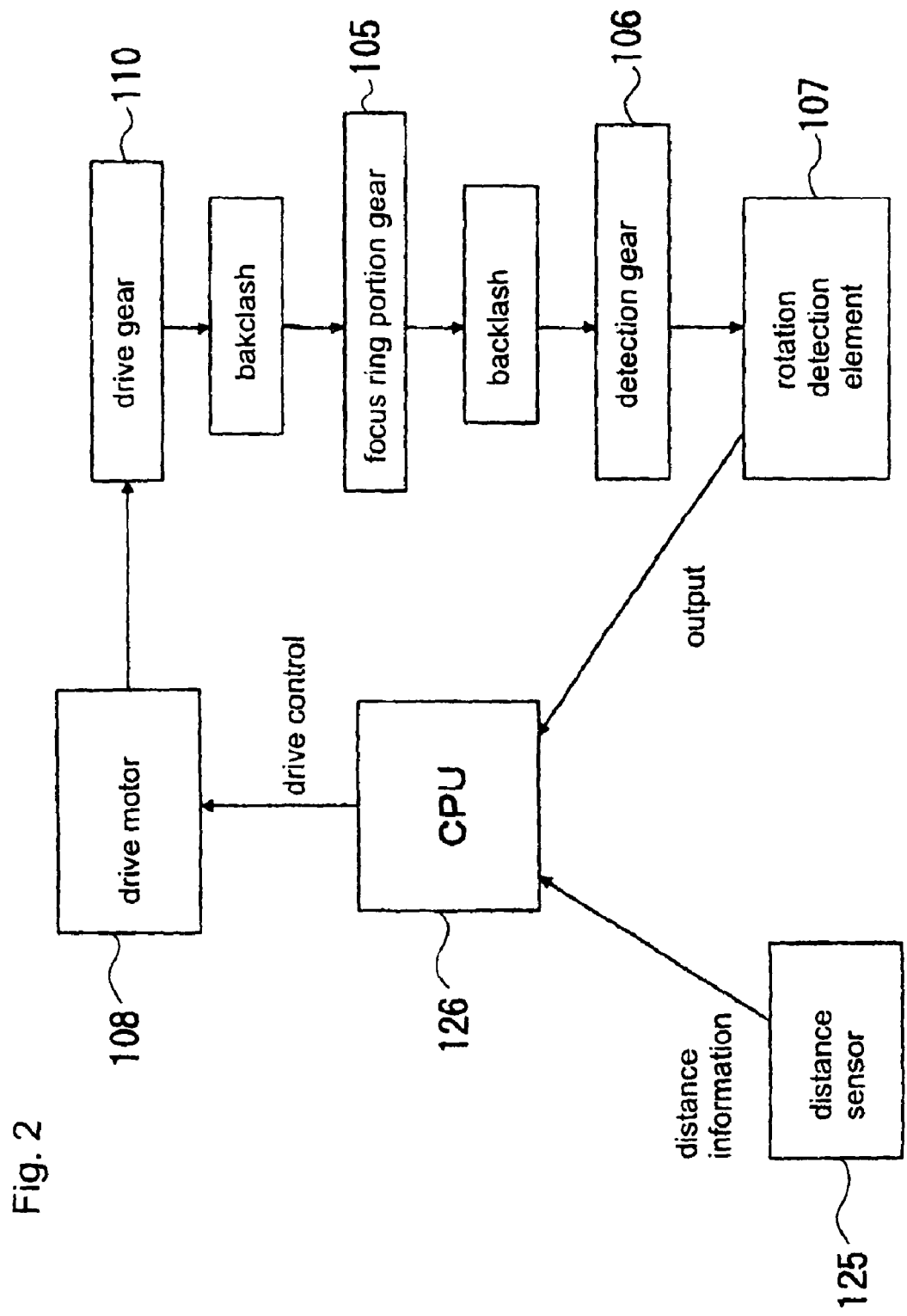
FIG. 2 shows a flowchart that illustrates a process for controlling the autofocus mechanism related to the present invention.

The projection type display apparatus of the exemplary embodiment to which autofocus mechanism 1 described above is applied includes a distance sensor (not shown) that detects a focal length as in the configuration in FIG. 2, and on the basis of distance information measured by the distance sensor, a CPU of control circuit 5 controls driving drive motor 8 so that the output of rotation detection element 7 reaches a predetermined value to rotate focus ring 4, thereby adjusting focus.

FIG. 8 shows a load applied to gears 11 and 12 in backlashless gear 6. When backlashless gear 6 and focus ring portion gear 5 mesh with each other in an ideal state, a backlash of about 0.07 mm is set between first gear 11 and second gear 12. Specifically, at this time, tooth surfaces of first gear 11 and second gear 12 are displaced about 0.07 mm from each other along the reference pitch circle.

Figure 9:
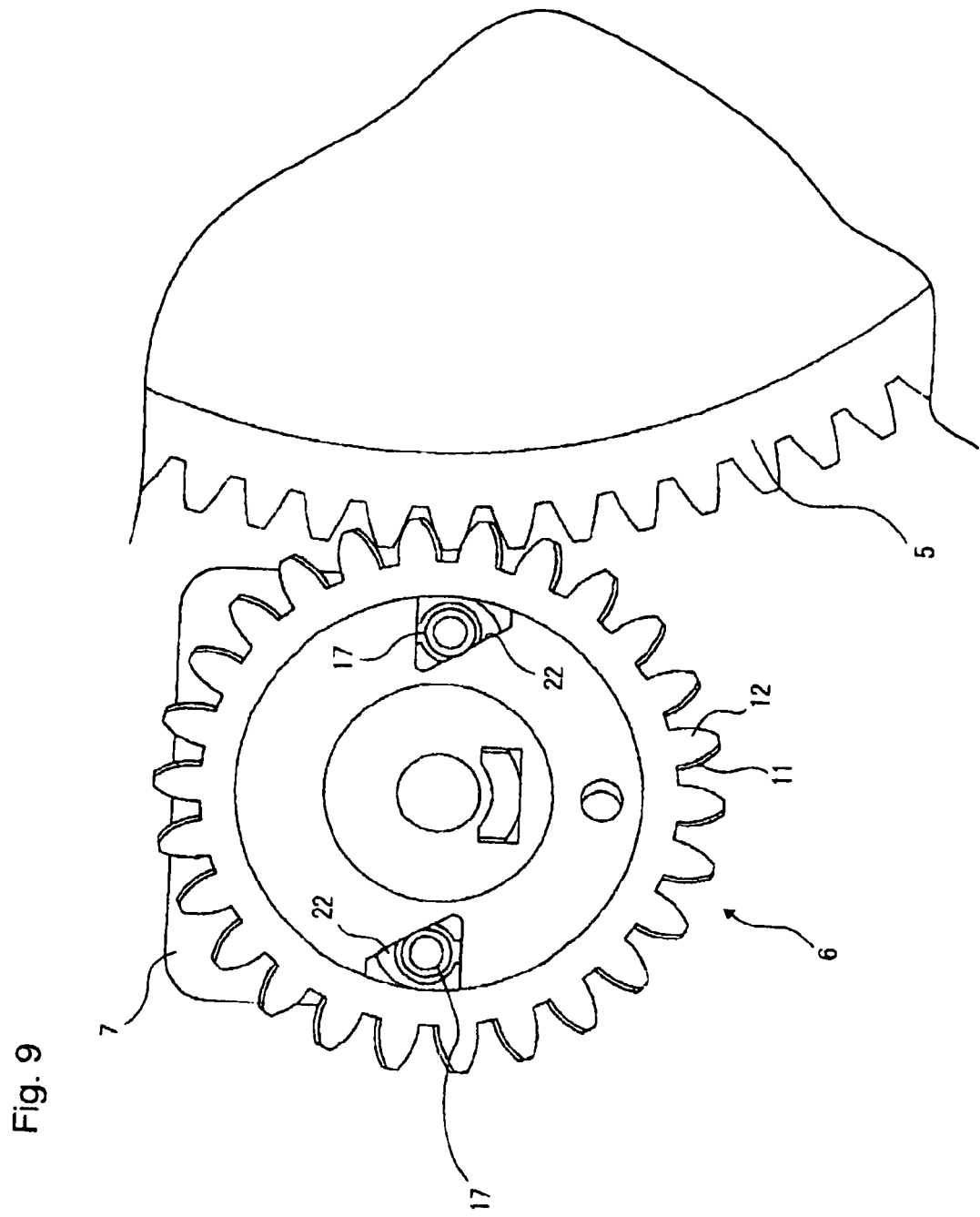
FIG. 9 is a plan view of a gear meshing state where backlash between the backlashless gear and a focus ring portion gear is eliminated in the exemplary embodiment.

At this time, each contact pin 17 formed on elastic displacement portion 15 of first gear 11 applies load F to each contact surface 22 of positioning portion 21 of second gear 12 by arm 16 bending and being elastically deformed with the rotation of second gear 12. Rotational direction component (component applied circumferentially of the gear) f of load F acts in a direction of circumferentially displacing the teeth of first gear 11 and second gear 12 from each other. Thus, displacement between the teeth of first gear 11 and second gear 12 in backlashless gear 6 is increased by the amount of backlash between backlashless gear 6 and focus ring portion gear 5, and as shown in FIG. 9, the backlash between backlashless gear 6 and focus ring portion gear 5 is eliminated. Even when the amount of backlash increases, the teeth of first gear 11 and second gear 12 of backlashless gear 6 are similarly circumferentially displaced from each other to eliminate the backlash.

According to the exemplary embodiment, backlashless gear 6 having the same diameter as detection gear 106 of autofocus mechanism 1 related to the present invention can eliminate rotational displacement between focus ring portion gear 5 of projection lens 3 and rotation detection element 7.

As described above, according to the exemplary embodiment, backlashless gear 6 including the combination of first gear 11 formed with elastic displacement portion 15 and second gear 12 formed with positioning portion 21 is provided, and thus the circumferential biasing force is applied to combined two gears 11 and 12 to cause crests of the teeth to be circumferentially displaced from each other. This eliminates the backlash between focus ring portion gear 5 described above and backlashless gear 6 mounted on rotation detection element 7, and eliminates rotational displacement between focus ring 4 and rotation detection element 7.

Specifically, backlashless gear 6 can be used to eliminate the backlash between focus ring 4 of projection lens 3 and rotation detection element 7. Thus, autofocus mechanism 1 of the exemplary embodiment can increase the accuracy of focus adjustment.

The combined gear according to the present invention is not limitedly applied to autofocus mechanism 1 described above, but is favorably used for eliminating backlash in a gear train having a relatively small diameter.

The present invention has been described with reference to the exemplary embodiment, but the present invention is not limited to the exemplary embodiment. Various changes in the configuration or details of the present invention that can be understood by those skilled in the art may be made within the scope of the present invention.

The invention claimed is:

1. A combined gear comprising a pair of gears having a same tooth profile and rotatably combined in a state wherein rotation centers of the gears are coincident,
    wherein one of said pair of gears comprises an elastic displacement portion that is biased in a direction of rotating an other gear with respect to said one gear,
    wherein said other gear comprises a positioning portion that positions said other gear with respect to said one gear, and said elastic displacement portion contacts said positioning portion,
    wherein said elastic displacement includes an arm arcuately extending circumferentially of said one gear,
    wherein said positioning portion includes a contact surface against which said arm of said elastic displacement portion makes contact, and said contact surface is formed to incline in a direction in which a normal line of a reference pitch circle of said other gear extends,
    wherein the arm comprises a cylindrical contact pin at an end of the arm,
    wherein said contact surface comprises a flat surface, and
    wherein the cylindrical contact pin makes contact with said contact surface in a state of point contact.

2. The combined gear according to claim 1, wherein a shaft portion that contacts said contact surface extends from said arm in parallel with an axial direction of said one gear, and
    said contact surface is formed in parallel with an axial direction of said other gear.

3. The combined gear according to claim 2, wherein contact points between said shaft portion of said arm and said contact surface are provided with a center of rotation of said gears therebetween, and said contact points are positioned on a line passing through said center of rotation.

4. A lens adjustment mechanism, comprising:
    a combined gear according to claim 3; and
    a rotation detection element that detects an amount of a rotation of said combined gear rotated with a movement of a lens in an optical axis direction.

5. A lens adjustment mechanism, comprising:
    a combined gear according to claim 2; and
    a rotation detection element that detects an amount of a rotation of said combined gear rotated with a movement of a lens in an optical axis direction.

6. A lens adjustment mechanism, comprising:
    a combined gear according to claim 1; and
    a rotation detection element that detects an amount of a rotation of said combined gear rotated with a movement of a lens in an optical axis direction.

7. An electronic apparatus comprising a lens adjustment mechanism according to claim 6.

8. A lens adjustment mechanism, comprising:
    a combined gear according to claim 1; and
    a rotation detection element that detects an amount of a rotation of said combined gear rotated with a movement of a lens in an optical axis direction.

9. The combined gear according to claim 1, further comprising another elastic displacement portion that is biased in the direction of rotating the other gear with respect to said one gear, said another elastic displacement portion being positioned opposite to the elastic displacement portion with respect to the rotation centers of gears.

10. The combined gear according to claim 9, further comprising another positioning portion that positions said other gear with respect to said one gear, said another elastic displacement portion contacting said another positioning portion, and said another positioning portion being positioned opposite to the positioning portion with respect to the rotation centers of gears.

11. The combined gear according to claim 1, wherein said cylindrical contact pin as a shaft portion is integrally formed at the end of the arm.

12. The combined gear according to claim 11, wherein said cylindrical contact pin extends in parallel with an axial direction of said one gear and contacts said other gear.

13. The combined gear according to claim 11, wherein the positioning portion comprises an opening portion in which said cylindrical contact pin on the arm of the elastic displacement portion is inserted, and wherein said cylindrical contact pin makes contact with said contact surface.

* * * * *